July 2, 1940.  J. HERSON  2,206,036
DISTANCE MEASURING APPARATUS AND SYSTEM
Filed July 27, 1938   2 Sheets-Sheet 1
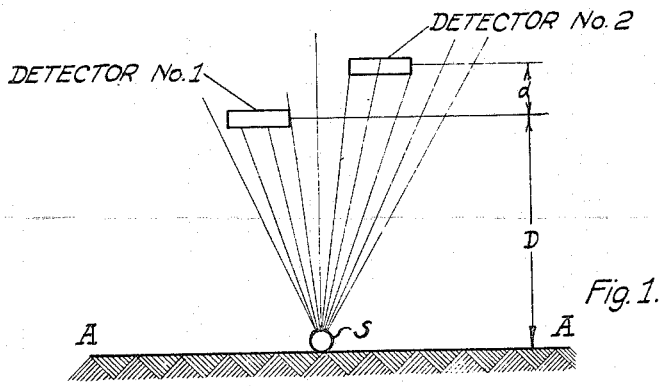
Fig. 1.
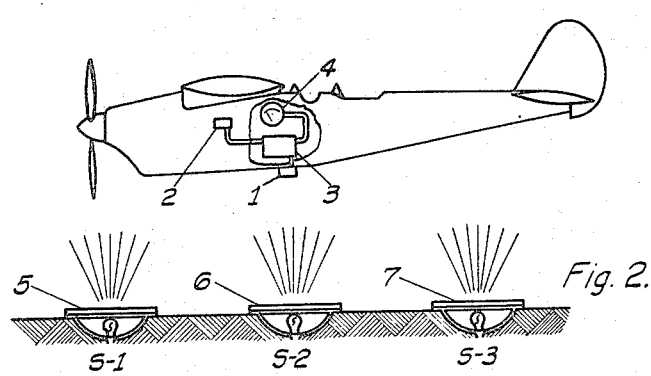
Fig. 2.
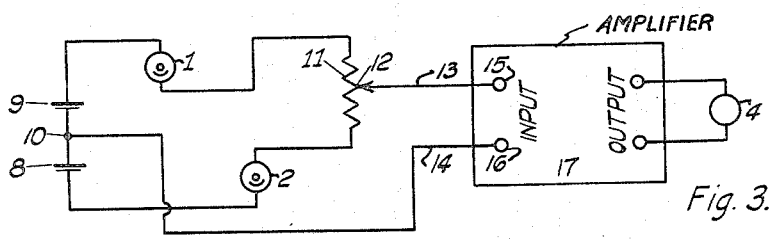
Fig. 3.
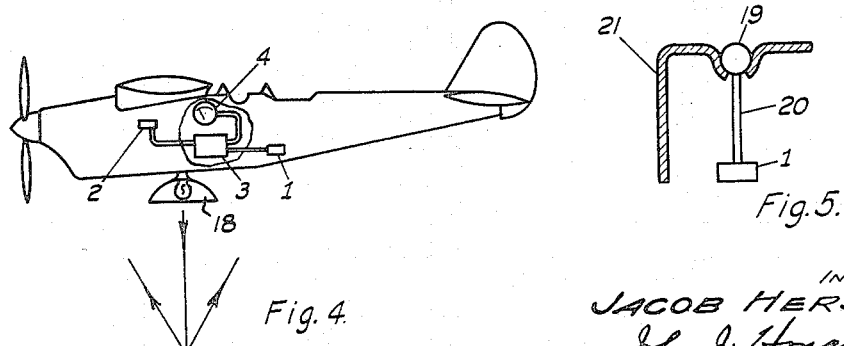
Fig. 4.
Fig. 5.
INVENTOR
JACOB HERSON
BY *John J. Homan* and *Ebade Koontz*
ATTORNEYS July 2, 1940.   J. HERSON   2,206,036

DISTANCE MEASURING APPARATUS AND SYSTEM

Filed July 27, 1938   2 Sheets-Sheet 2

INVENTOR
JACOB HERSON
BY John J. Tolman and
Blade Krotz
ATTORNEYS

Patented July 2, 1940

2,206,036

UNITED STATES PATENT OFFICE 2,206,036

DISTANCE MEASURING APPARATUS AND SYSTEM

Jacob Herson, Dayton, Ohio

Application July 27, 1938, Serial No. 221,637

9 Claims. (Cl. 250—1)

(Granted under the act of March 3, 1883, as amended April 30, 1928; 370 O. G. 757)

The invention described herein may be manufactured and used by or for the Government for governmental purposes, without the payment to me of any royalty thereon.

My invention pertains to a new method of indicating the height of aircraft above ground, a method particularly suitable for blind landing operations in which the aircraft is pursuing a straight course over the landing field towards a definite point on the ground. It is the primary purpose of my invention to provide such an altitude indicator although it can also be applied to distance finding and collision prevention.

The method of the invention utilizes electromagnetic radiation in the visible and infra-red portions of the spectrum and a pair of detectors displaced a short distance from each other in the direction of arrival of radiation.

In the accompanying illustrations:

Figure 1 illustrates the principle of my invention.

Figure 2 shows a particular form of the altimeter in which the source of radiation is located on the ground.

Figure 3 is a schematic diagram of the equipment in the aircraft for the form of altimeter shown in Figure 2.

Figure 4 shows another form of my invention in which both the source of radiation and the altimeter proper are located in the aircraft.

Figure 5 shows a method of mounting detectors of radiant energy on the aircraft.

Figure 2A:
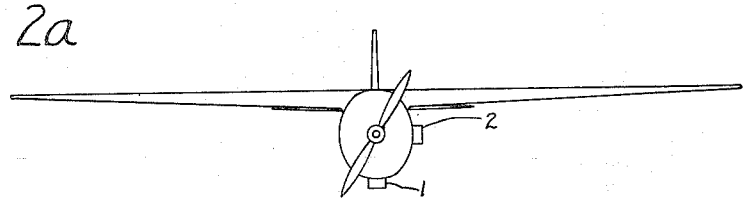
Figure 2a is a front elevational view of the airplane shown in Figure 2.

Referring to Fig. 1 let A—A represent the earth's surface (or any other reference surface). Let this surface contain a source S of electromagnetic radiation visible or infra-red. The intensity at any point over the source of radiation will be a function of the distance from the reference plane. In the case of a point source the intensity is known to be inversely as the square of the distance from the source. Let two sensitive detectors, No. 1 and No. 2, separated by a fixed distance "$d$" from each other move as a unit away from the surface A—A. Thus, if in any position the distance of detector No. 1 from the reference plane is "$D$" the distance of detector No. 2 from the reference plane is "$D+d$". If the detectors possess a straight line characteristic, i. e. their response is proportional to the radiation intensity and if we have a means of accurately measuring the ratio of their responses we have then a method of measuring the distance from or the elevation above the reference surface A—A. This will be clear if we note that the ratio of the respective distances of the two detectors from the source is $$\frac{D}{D+d}$$

where $D$ is the variable distance of detector No. 1 from the reference surface and $d$ is the constant separation between the detectors. Near the surface A—A ($D$ is then small and comparable with $d$) the ratio of the respective distances of the detectors from the source of radiation is much different from unity and so is the ratio of the intensities of radiation at the points in question and of the responses of the detectors. As the value of $D$ is becoming greater, i. e. as the detectors are moving away from the source the ratio of their respective distances is approaching unity and so does the ratio of their responses. To illustrate using a numerical example: Consider a small source of radiation and let the variation of intensity with distance from the source follow the inverse square law. The relative intensity a distance 1 foot from the source may be designated as 100. Let the fixed distance between the two detectors be 2 feet ($d=2$). When detector No. 1 is only 10 feet from the source detector No. 2 is 12 feet from the source and the ratio of the intensities and of the detectors' responses is $$\frac{100/10^2}{100/12^2}=1.44$$

When the detectors are farther from the source so that the detector No. 1 is, say, 50 feet and detector No. 2, 52 feet from the source respectively the ratio of intensities and responses becomes $$\frac{100/50^2}{100/52^2}=\frac{2704}{2500}=1.08$$

It is not of course necessary that the variation of intensity with distance from the source be in accordance with the inverse square law. Variation of intensity with distance in some other manner will simply require a change in the calibration of the device. It will also be noted that the intensity of the source does not affect the result and the ratio of the intensities corresponding to a given position of the detectors remains the same as long as the manner of variation of the relative intensity with distance remains unchanged.

Fig. 2 represents one particular form of my invention. S—1, S—2, S—3, etc., are sources of radiation. These sources are located in a straight line in the direction which the aircraft is to follow during the landing operation. The radiation from these sources is directed upward by means of suitable reflectors. Two photoelectric cells 1 and 2 are used in the aircraft. Cells of a spectral response extending as far as possible into the infra-red are most suitable. The photocells are located on the aircraft at different elevations with their sensitive surfaces facing downward. In order to eliminate the effect of small changes in the attitude of the aircraft on the calibration of the altimeter the detectors may be mounted on the aircraft as shown in Fig. 5. The detector is rigidly attached to a short rod 20 which is in turn attached to the aircraft by means of a swivel joint 19 so that the rod 20 remains substantially vertical, and the detector is always facing downward, and its response is not affected by small changes in the attitude of the aircraft. The detector and its mounting are protected from the air pressure caused by the forward motion of the aircraft by a small wind shield 21. The particular locations of the detectors will necessarily vary with the type of aircraft. Since the two photocells are at different distances from the source of radiation their responses will not be the same. A voltage proportional to the ratio of the responses of the two cells is obtained by a special bridge circuit and then amplified. The ratio-indicating circuit and the amplifier constitute one unit 3 located in any convenient place in the aircraft. The output of the amplifier is indicated by an instrument 4 located on the instrument board. As has been previously explained the indication of the instrument will be a function of the aircraft's elevation above ground and the instrument can therefore be calibrated directly in feet of elevation.

The schematic diagram of the equipment carried in the aircraft is shown in Fig. 3. In this Fig. 3 numbers 1 and 2 designate two photoelectric cells connected in series to two similar batteries 8 and 9 with a potentiometer 11 between the said cells. The electrical midpoint 10 between the two batteries and the moving contact 12 of the potentiometer are connected through leads 13 and 14 to the input terminals 15 and 16 of the D. C. amplifier 17. The output of the amplifier is read on the indicator 4 located on the aircraft's instrument board. The two photocells 1 and 2 together with the two batteries 8 and 9 and the potentiometer 11 form a bridge circuit. If both photocells are exposed to radiation of equal intensity the bridge is balanced and there is no potential difference between leads 13 and 14. The purpose of the potentiometer 11 and its sliding contact is to adjust for slight inequalities that may exist between the two batteries and obtain a balance for the condition of equal intensities. Since, however, the intensities of the radiation incident on the two photocells are not equal the bridge arrangement becomes unbalanced, and a potential difference proportional to the ratio of the intensities of radiation incident on the two cells appears between the leads 13 and 14. This potential difference is amplified by the D. C. amplifier 17 the output of which is indicated on the indicator 4. The amplifier is designed so that at zero input voltage (condition of equal intensities) the indicator reads zero. The indicator scale may be calibrated directly in feet of elevation. While one arrangement for obtaining a measurement of the ratio of the intensities of radiation at the two points of detection is shown and described it is obvious than any other arrangement by which an electrical effect proportional to the ratio of intensities is produced may be employed. Instead of placing the sources of radiation at definite points along the runway as shown in Fig. 2 the entire runway may be "illuminated" from concealed sources and the radiation reflected from the ground surface utilized in a similar manner. A concrete runway surface treated to have good reflection characteristics is most suitable, as for example painting with aluminum paint.

Still another form of my invention is shown in Fig. 4. The entire equipment including the source of radiation 18 is carried on the aircraft. The device operates as in Fig. 2, except that detectors 1 and 2 are actuated by the radiation after it is reflected from the ground. The radiator is carefully shielded so that direct radiation does not reach the detectors' sensitive surfaces.

Figure 6:
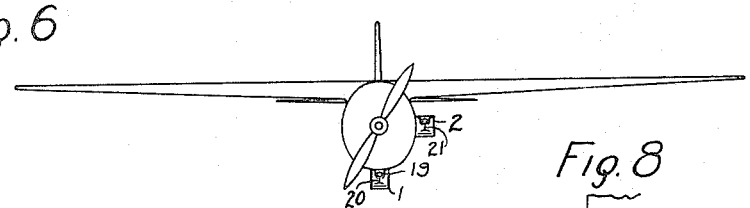
Figure 6 is a view similar to Figure 2a showing the detectors supported in the manner illustrated in Figure 5.

It has been pointed out that the calibration of the altimeter depends only on the manner in which the intensity of radiation varies with distance from the source. It is well known that visible light is absorbed considerably by water vapor and impurities that may be present in the atmosphere and therefore the altimeter which has been once calibrated for clear air will no longer indicate correct altitudes in fog. To eliminate this source of error the effective radiation can be limited to infra-red radiation which undergoes very little absorption. This can be readily accomplished by the use of filters. Such filters 5, 6 and 7 are shown over the radiators S—1, S—2 and S—3 respectively in Fig. 2. Instead of using filters 21, as diagrammatically illustrated in Fig. 6, over the radiators similar filters may, of course, be used over the detectors.

Figure 7:
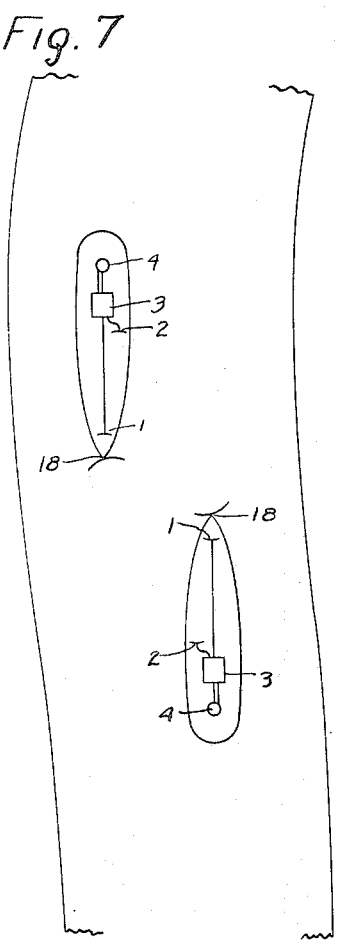
Figure 7 is a schematic view showing a further variation of my invention as applied to boats for prevention of collision.
Figure 8:
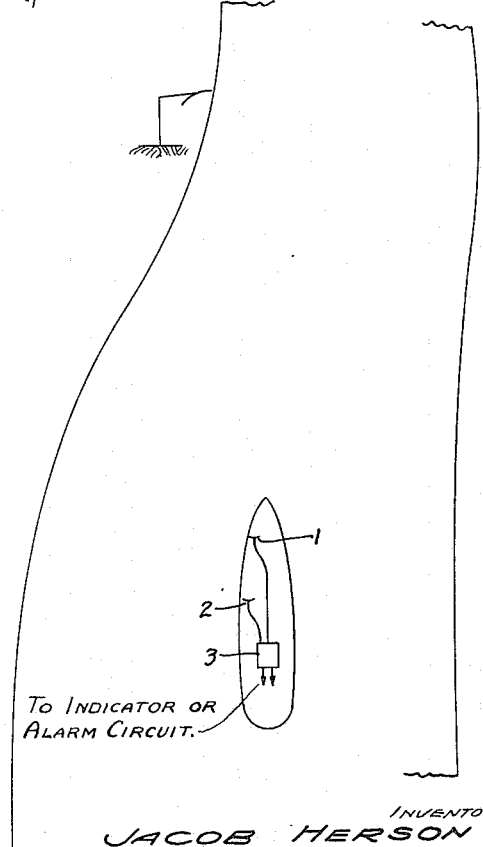
Figure 8 is a view similar to Figure 7 showing a further variation of my invention.

The invention is not limited to the use as an altitude indicator. It can obviously be applied to distance finding as well, also as a collision preventing device between two moving objects or between a moving and a stationary object. For example, boats, as shown in Fig. 7, may be equipped with radiators 18 and equipment similar to that shown in Fig. 2 and similarly arranged. The equipment can be then turned on when visibility is poor and thus show the approach of any other boat similarly equipped. The indicator may be replaced by a relay and an alarm circuit, as shown in Fig. 8, thus obviating the necessity of constantly watching the indicator. A possible application between stationary and moving objects is in warning boats when approaching danger spots such as rocks or shallow places. For this application a radiator is to be installed at the place of danger, as shown in Fig. 8, and the detecting equipment, similar to that shown in Fig. 2 and similarly arranged, installed on the boat.

What I claim as new and desire to secure by Letters Patent is:

1. Means for measuring the distance of an object from a point from which radiant energy is emitted, comprising means carried by the object, including two detectors responsive to such radiant energy, said detectors being suitably spaced with respect to each other a definite distance apart in the direction of arrival of said radiation, means for combining the detected energies and for producing therewith an electrical effect whose magnitude is a function of the relative attenuation of the radiant energy in the space separating the two detectors, and means for utilizing the electrical effect.

2. Means for measuring the distance of an object from a point from which radiant energy is emitted, comprising means carried by the object, including two detectors responsive to such radiant energy, said detectors being suitably spaced with respect to each other a definite distance apart in the direction of arrival of said radiation, means for combining the detected energies and for producing therewith an electrical effect whose magnitude is a function of the relative attenuation of the radiant energy in the space separating the two detectors, and means for indicating the electrical effect, including a meter calibrated in terms of distance between a predetermined point and the nearer one of said detectors.

3. Means for measuring the distance of an object from a predetermined point from which radiant energy is emitted, comprising means carried by the object, including two detectors responsive to said radiant energy, said detectors being suitably spaced with relation to each other a definite distance apart in the direction of arrival of said radiation, with circuit means associated with said detectors for establishing the potential difference corresponding to the relative attenuation of the radiant energy in the space between the said detectors, and means for measuring the said potential difference.

4. Means for measuring the distance of an object from a point of reference comprising two photoelectric cells carried by the object and arranged to receive energy from said point of reference at points predeterminately spaced substantially in the direction of arrival of said radiant energy; means for combining the detected energies and for producing therewith an electrical effect, the magnitude of which is a function of the relative attenuation of the radiant energy in the space separating the two detectors; and means for indicating the electrical effect, including a meter calibrated in terms of distance between the point of reference and the nearer one of said detectors.

5. Means for measuring the distance of an object from a point of reference comprising two photoelectric cells carried by the object and arranged to receive energy from said point of reference at points predeterminately spaced substantially in the direction of arrival of said radiant energy; means for combining the detected energies and for producing therewith an electrical effect, the magnitude of which is a function of the relative attenuation of the radiant energy in the space separating the two detectors; means connected with said detectors for amplifying the produced electrical effect; and means for indicating the electrical effect, including a meter calibrated in terms of distance between the point of reference and the nearer one of said detectors.

6. Means for measuring the distance of an object from a point of reference comprising a source of radiant energy carried by and arranged on said object for transmitting radiant energy to said point of reference for reflection therefrom, means carried by the object and arranged to detect reflected energy only at different points displaced substantially in the direction of arrival of radiation of the energy transmitted from the point of reference, means for combining the detected energies to produce an electrical effect which is a function of the ratio intensities of the radiant energies at the points of detection and means for utilizing the electrical effect.

7. In combination, means for measuring the distance of an object from a point of reference comprising means at said point of reference for transmitting radiant energy, means carried by the object and arranged to receive energy at points predeterminantly spaced substantially in the direction of arrival of said radiant energy, means associated with one of said means for modifying the spectral distribution of the effective radiant energy, means for combining the detected energies to derive a resultant current and means for utilizing said resultant current.

8. Means for measuring the distance of an object from a point of reference comprising means carried by the object and arranged to detect energy at different points displaced substantially in the direction of arrival of radiation of the energy transmitted from the point of reference, means associated with said detecting means for modifying the spectral response thereof, means for combining the detected energies to produce an electrical effect which is a function of the ratio intensities of the radiant energies at the points of detection and means for utilizing the electrical effect.

9. In a distance measuring system for use in an aircraft comprising means on the ground for transmitting radiant energy, two detectors on said aircraft arranged for detecting said radiant energy and arranged to detect energy at different points displaced substantially in the direction of arrival of radiation of the energy transmitted from the point of reference, means for combining the detected energies to produce an electrical effect which is a function of the ratio intensities of the radiant energies at the points of detection and means for utilizing the electrical effect.

JACOB HERSON.